(12) United States Patent
Alve

(10) Patent No.: US 8,234,404 B2
(45) Date of Patent: *Jul. 31, 2012

(54) PROXIMITY ENFORCEMENT IN HETEROGENEOUS NETWORK ENVIRONMENTS

(75) Inventor: Jukka Alve, Vantaa (FI)

(73) Assignee: Nokia Corporation, Espoo (FI)

( * ) Notice: Subject to any disclaimer, the term of this patent is extended or adjusted under 35 U.S.C. 154(b) by 268 days.

This patent is subject to a terminal disclaimer.

(21) Appl. No.: 12/564,472

(22) Filed: Sep. 22, 2009

(65) Prior Publication Data

US 2010/0008252 A1     Jan. 14, 2010

Related U.S. Application Data

(63) Continuation of application No. 11/437,623, filed on May 22, 2006, now Pat. No. 7,613,829.

(51) Int. Cl.
*G06F 15/173* (2006.01)

(52) U.S. Cl. ......... 709/241; 709/238; 709/224; 709/217

(58) Field of Classification Search .................. 709/241, 709/238, 223–224, 217, 229
See application file for complete search history.

(56) References Cited

U.S. PATENT DOCUMENTS

| | | | |
|---|---|---|---|
| 7,158,800 B2 | 1/2007 | Stephens et al. | |
| 7,398,392 B2 | 7/2008 | Weber | |
| 7,483,391 B2 | 1/2009 | Xu et al. | |
| 7,519,181 B2 | 4/2009 | Shaheen et al. | |
| 7,613,829 B2 * | 11/2009 | Alve | 709/241 |
| 2004/0098583 A1 * | 5/2004 | Weber | 713/168 |
| 2005/0234735 A1 | 10/2005 | Williams | |
| 2005/0262022 A1 | 11/2005 | Oliveira et al. | |
| 2006/0179001 A1 * | 8/2006 | Kim et al. | 705/57 |
| 2007/0058559 A1 | 3/2007 | Xu | |
| 2007/0113081 A1 | 5/2007 | Camp | |
| 2007/0168661 A1 * | 7/2007 | Chaney | 713/168 |
| 2007/0192480 A1 | 8/2007 | Han et al. | |

* cited by examiner

*Primary Examiner* — Philip B Tran
(74) *Attorney, Agent, or Firm* — Banner & Witcoff, Ltd.

(57) ABSTRACT

The invention provides an enforcement mechanism for limiting the propagation of content to a predefined proximity in a heterogeneous network. The protection mechanism determines the distance associated with wireless links of the heterogeneous networks and verifies that the distance is within the predefined proximity limits. The distance may be measured by evaluating the signal strength of received signals. The protection mechanism further uses round trip time determinations to enforce the proximity limits on wired or unknown segments of the heterogeneous network. Specifically, the round trip time associated with a wired or unknown segment may be determined using the round trip time associated with the wireless segments and the total round trip time of the network as a whole. The round trip time of the wired or unknown segment is then compared to a round trip time limit associated with the proximity requirement for distributing content.

17 Claims, 7 Drawing Sheets

PROXIMITY ENFORCEMENT IN HETEROGENEOUS NETWORK ENVIRONMENTS

CROSS-REFERENCES TO RELATED APPLICATIONS

This application claims the benefit of priority from and is a continuation of U.S. application Ser. No. 11/437,623, entitled "PROXIMITY ENFORCEMENT IN HETEROGENEOUS NETWORK ENVIRONMENTS" and filed on May 22, 2006, now U.S. Pat. No. 7,613,829.

FIELD OF THE INVENTION

Embodiments of the invention relate generally to a method and a system for enforcing content protection of electronic content. Specifically, embodiments of the invention relate to enforcing proximity limits on redistribution of content within a network environment.

BACKGROUND OF THE INVENTION

As electronic media and other types of electronic content become increasingly popular, the need for implementing post delivery content protection and copyright management has also gained importance. In many instances, content creators wish to prevent the redistribution of content to third parties while allowing a content user to distribute the content to family members or other devices the user may own. Accordingly, content protection mechanisms have been developed to restrict redistribution and propagation of content to a limited area or distance. Such methods include using time to live (TTL) parameters in content packets, e.g., Internet Protocol (IP) packets, that limit the transmission of content to within a certain number of network segments. However, methods for circumventing the use of such TTL parameters have been developed and have weakened the level of protection provided by TTL mechanisms.

Another form of proximity restriction involves specifying a cap for the round-trip time, i.e. the amount of time required for the source device to receive a response from the sink device to an echo request. The implementation of a round trip time cap is intended to limit the distance a particular content item may be sent. However, setting a single uniform round trip time limit is often unable to anticipate and factor in the inherent delays associated with various network protocols. For example, wireless connections and wired connections often have different delays for transmitting data over the same distance. As such, a round trip time limit may prevent legitimate transfers of data over an authorized distance while allowing other transfers over distances greater than intended.

For the foregoing reasons, a system and method for enforcing proximity limitations in content distribution and propagation is needed.

SUMMARY OF THE INVENTION

Many of the aforementioned problems are solved by providing a method and system for enforcing proximity requirements in content distribution that combines multiple mechanisms of evaluating transmission distance. The combination of multiple mechanisms in determining transmission distances allows for a content distribution system to compensate for varying inherent delays associated with different network configurations. Specifically, a different distance determination protocol is implemented for wireless and/or trusted portions of the network than for wired, untrusted or unknown network portions. A portion of the network may include one or more network segments that link two or more network devices. In one example, wireless portions of the network may include one or more wireless network links that employ RF signals for transmitting data between devices. Using an inherent relationship between the strength of a received power and the square of the transmission distance, the distance of a segment of the wireless portion of the network may be explicitly calculated. The distance of the wireless segment may then be compared to a predefined proximity limit to determine whether the wireless segment meets the proximity requirement.

A round trip time or transit time for the overall network as well as for the wireless or trusted portion of the network may further be determined to ascertain the round trip time for the untrusted portion of the network. That is, the difference between the round trip time of the overall network and the round trip time associated with the wireless portion of the network may equate to the round trip time associated with just the wired or untrusted portion of the network. Accordingly, the round trip time of the wired or untrusted portion of the network may be compared to a predefined round trip time budget or limit to insure that the proximity requirement has been met.

In one aspect, the determination of whether a network meets the proximity requirement is performed by the transmitting device. The transmitting device may further request distance and/or round trip time information from one or more devices in the network to enhance the accuracy and adaptability of the content protection mechanism. In another aspect, the determination may be made by the destination device. The destination device may request relevant distance and round trip time information from the source device as well as any other network device. If the proximity requirement is not met, the destination device may refuse the corresponding transfer.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
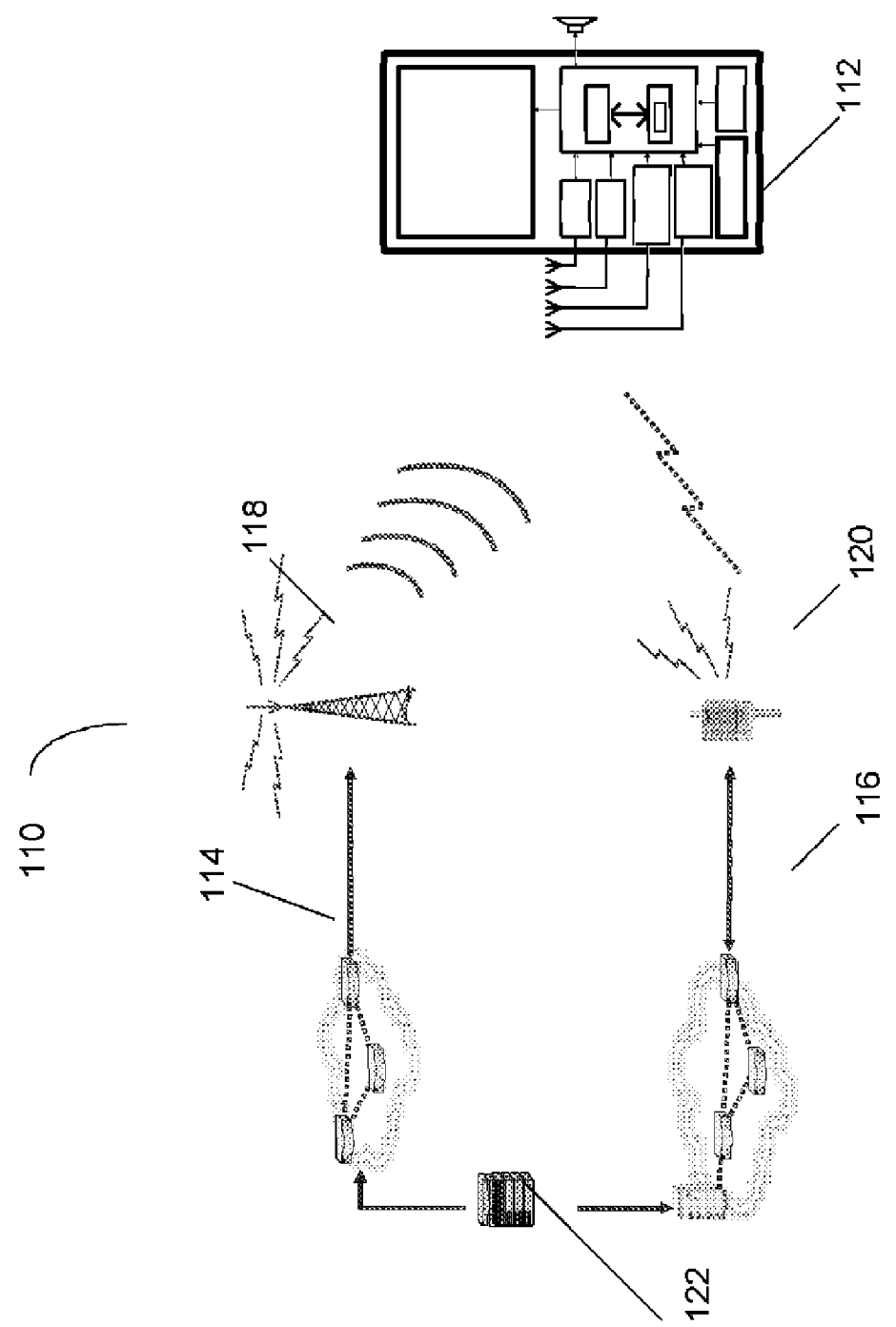
FIG. 1 illustrates a block diagram of a wireless communication system in which various embodiments may be implemented.

Aspects of the present invention may be utilized across a broad array of networks and communication protocols. In particular, content that is subject to redistribution limitations may originate through one or more types of wireless communication systems. FIG. 1 illustrates an example of a wireless communication system 110 through which content may be initially distributed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 (which may include the internet or similar network) and/or cellular network 116. The mobile terminal/device 112 may comprise a digital broadband broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, AM/FM radio service providers, SMS/MMS push service providers, Internet content or access providers.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). Methods of digital broadcasting include Digital Video Broadcasting (DVB)-Terrestrial (T), -Cable (C) and -Satellite (S).

DVB transport streams deliver compressed audio and video and data to a user via third party delivery networks. Moving Picture Expert Group (MPEG) standards including standards by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, may be incorporated into the TS. This enables a receiver device to correctly process the data contained within the TS.

Aspects of the present invention, however, are also applicable to content originally distributed over other traditional digital broadcast systems such as, for example, T-DAB, T/S-DMB, ISDB-T, ATSC, MediaFLO, and non-traditional systems such 3GPP MBMS and 3GPP2BCMCS.

The mobile device 112 may also establish communications with the service source 122 through the cellular network 116. The cellular network 116 may comprise a wireless network and a base transceiver station transmitter 120. Wireless networking protocols may include both long-range and short-range wireless protocols such as 802.11, Bluetooth and Bluetooth PAN and the like. The cellular network may include a second/third-generation (2G/3G) cellular data communications network, a Global System for Mobile communications network (GSM), a Universal Mobile Telecommunications System (UMTS) or other wireless communication network such as a WLAN network. These wireless and cellular technologies may be used separately or in combination in establishing a content distribution or propagation network between a source device and a content sink.

In one aspect of the invention, mobile device 112 may comprise a wireless interface configured to send and/or receive digital wireless communications within cellular network 116. The information received by mobile device 112 through the cellular network 116 or broadcast network 114 may include applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
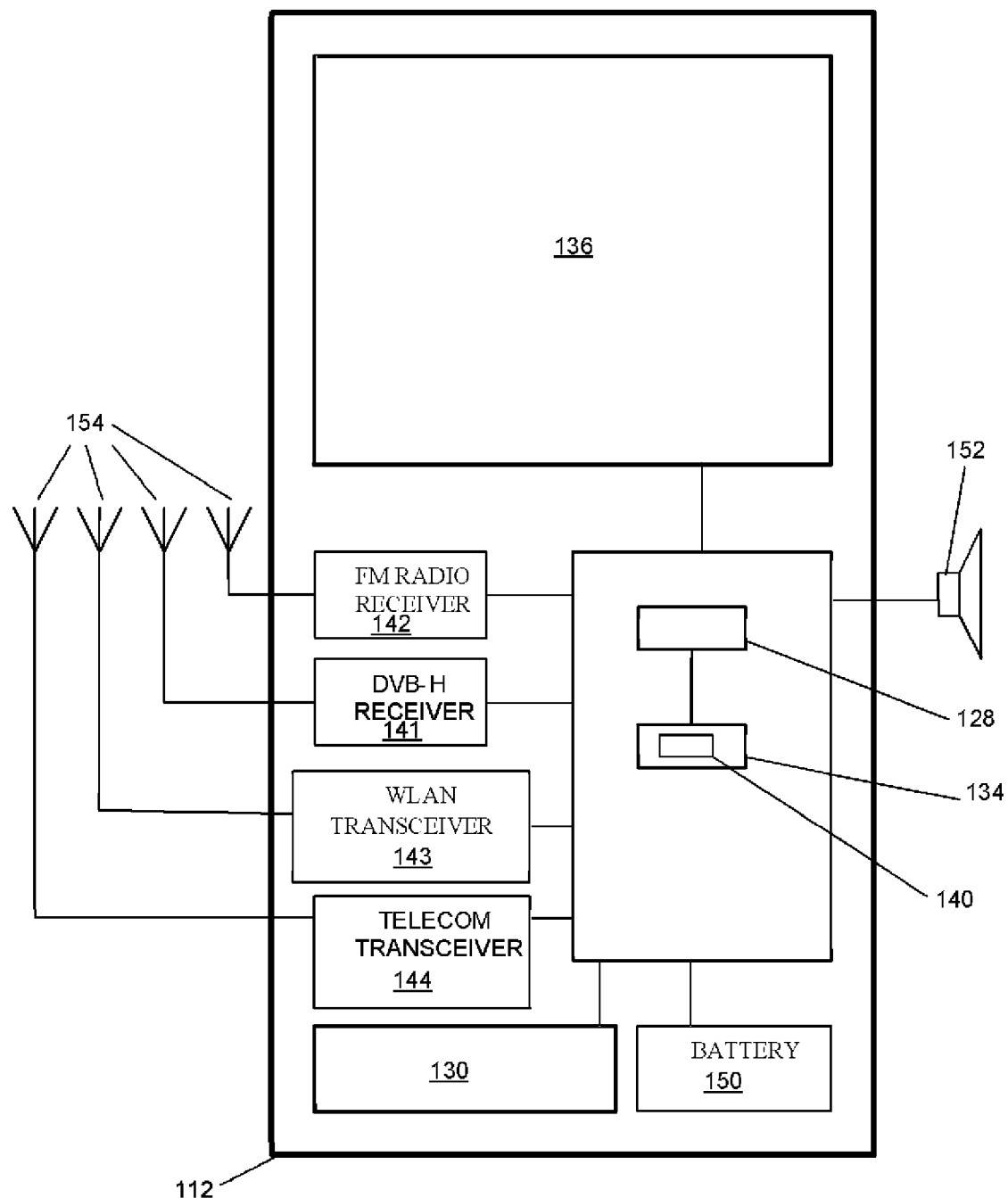
FIG. 2 illustrates a digital terminal in which one or more illustrative embodiments may be implemented.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, stylus, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of the computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H, DVB-T, DVB-C, DVB-S or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

Further, content distributed over DVB networks and the like through devices such as mobile device 112 of FIG. 2 may be protected using various digital rights management protocols or copyright mechanisms such as Digital Transmission Content Protection-Internet Protocol (DTCP-IP). These standards may seek to limit the extent of content propagation to within a specified proximity of the content source. DTCP-IP adopts content protection mechanisms using Time-To-Live (TTL) parameters embedded in IP data packets. TTL parameters specify the number of hops that the packet is permitted to make before a transfer is refused by a receiving device. For example, a content item such as a music video may be transmitted with a designated TTL of 3. In other words, the distribution of the music video would be permitted to up to a distance of 3 hops. A hop refers to a network segment or link between two network devices in a network path. Each intermediate device in the network path, upon receiving the content, decrements the TTL prior to sending the content to the next device on the network path. If the TTL counter reaches zero, the destination device may refuse the content.

Other enforcement mechanisms include instituting round trip time (RTT) limits. Round trip time (RTT) generally refers to the amount of time necessary for a message to be sent to a destination device and for an acknowledgment or response message to be received at the sending device. RTT limits may be used to provide an additional or alternative level of content protection in the event network devices are manipulated so that they do not properly decrement the TTL counter of a content packet. However, one issue with using a single RTT limit in determining whether a proximity requirement has been met is that different heterogeneous networks may have different inherent RTT delays since the make-ups of the networks may differ. For example, wireless segments of a network may have a different delay than a wired network segment. As such, a single uniform RTT limit may prevent propagation in some networks that physically satisfy the proximity requirement but which fail to meet the RTT limit due to the different inherent delays of the network links used. To overcome this obstacle, a combination of network metrics for determining proximity and distance may be used for evaluating content propagation over heterogeneous networks. For example, the distance of wireless network segments may be evaluated using explicit distance information while wired segments may be analyzed using RTT data.

Figure 3:
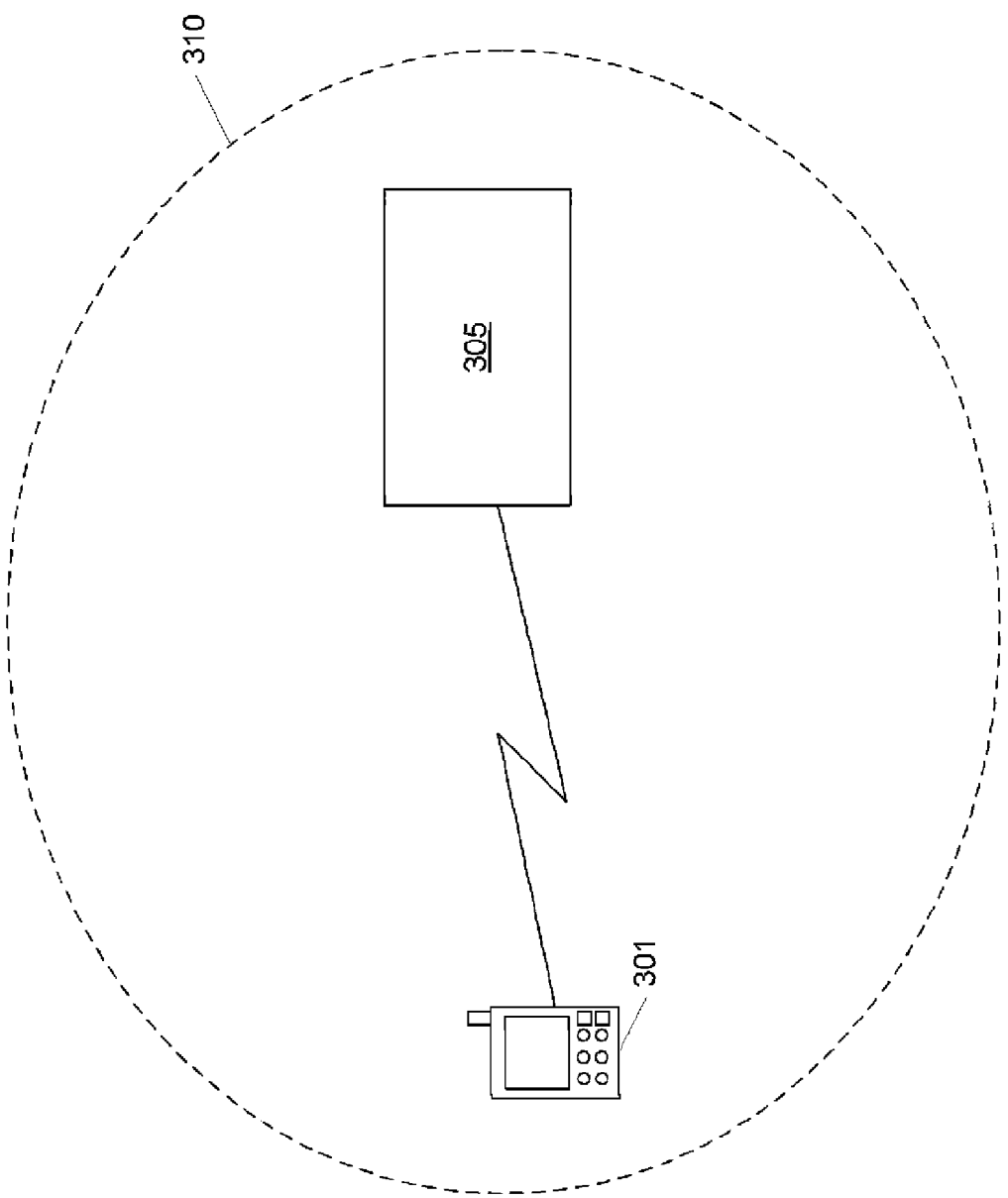
FIG. 3 illustrates a wireless segment of a content distribution network according to one or more aspects described herein.

FIG. 3 is a block diagram of a wireless segment of a content distribution network. In particular, terminal 301 is wirelessly connected to device 305 of the distribution network. The wireless connection may be established using a variety of wireless protocols including those discussed with respect to FIGS. 1 and 2. Content distributed by terminal 301 may specify or define a proximity threshold such as proximity boundary 310 within which distribution of the content is authorized. If terminal 301 detects that destination device 305 and/or an intermediary device is outside of proximity boundary 310, a request to propagate the content to the specified device 305 may be denied. In one example, a content item may be restricted to distribution within a home network. That is, the content source may allow a user to distribute the content to family members or to additional devices belonging to the user. Thus, the content item may have embedded therein one or more parameters which specify a transmission distance restriction such as 200 feet to limit content transfers to within the confines of the home.

To enforce the transmission restrictions, terminal 301 may use a variety of distance determination techniques. In particular, terminal 301 may measure the strength of the transmission signal or burst received from destination device 305. Using the received transmission strength, terminal 301 may calculate the distance of the wireless link based on, in some instances, a mathematical formula and relationship. For example, distance may be calculated in a wireless network that uses radio frequency (RF) transmission signals based on the inverse relationship between the received power of a transmission signal and the square of the distance. In one or more configurations, a transmission power associated with the signal may further be provided to terminal 301 as part of the signal. The transmission power may be fixed by a corresponding radio standard, or, alternatively or additionally, if the standard provides for multiple power levels, the actual power currently used may be communicated over the radio link. In one example, Bluetooth technology uses a Link Manager Protocol (LMP) for communicating the transmission power. Terminal 301 may initially transmit an echo request to destination device 305 to determine the transmission distance prior to transferring the actual content. If the determined distance is greater than the specified transmission distance restriction, terminal 301 may refuse to transfer the content. Alternatively or additionally, a transmission distance check may also be performed at destination device 305. Using the received power associated with the echo request or the transfer of the content, destination device 305 may determine whether the distance between device 305 and source terminal 301 meets the proximity requirement specified in the content. If the proximity requirement is not met, device 305 may reject the transfer and send an appropriate message to source terminal 301.

In one or more configurations, a network (e.g., home computer network) may be routed over several intermediate network devices, such as routers, requiring content to be transferred over multiple hops and using a mix of both wired and wireless network protocols. While it is possible to configure the source device and sink device in accordance with the employed copyright enforcement protocol, it is often difficult to do so with intermediate network devices and segments that are not immediately connected to either the source or sink device. In particular, intermediate network devices may be altered or manipulated to circumvent digital rights management mechanisms and/or content protection protocols. For example, network routers may be modified such that the routers do not appropriately decrement a TTL parameter of a transmitted message or manipulated such that transmission times are falsified and rendered unreliable. Such modifications and manipulations would allow a message or content item to be transmitted over a distance greater than originally intended by the content creators or originators. Accordingly, these segments of a network may be referred to as "untrusted" network segments or collectively known as an untrusted portion of the network since the reliability of content protection and the enforcement of the untrusted portion or segments is unclear. The untrusted portion or segments may include wired links, wireless connections or both.

In order to enforce content protection over the untrusted portion of a network, the RTT for transmitting data over the segment or segments of the untrusted portion may be evaluated and compared to a predefined transmit time threshold. This threshold may be calculated based on a predetermined average RTT associated with a network of a given distance. Since the untrusted or wired network segments generally have similar inherent delays, the use of RTT to evaluate whether these segments satisfy a proximity requirement is subject to less variation.

Figure 4:
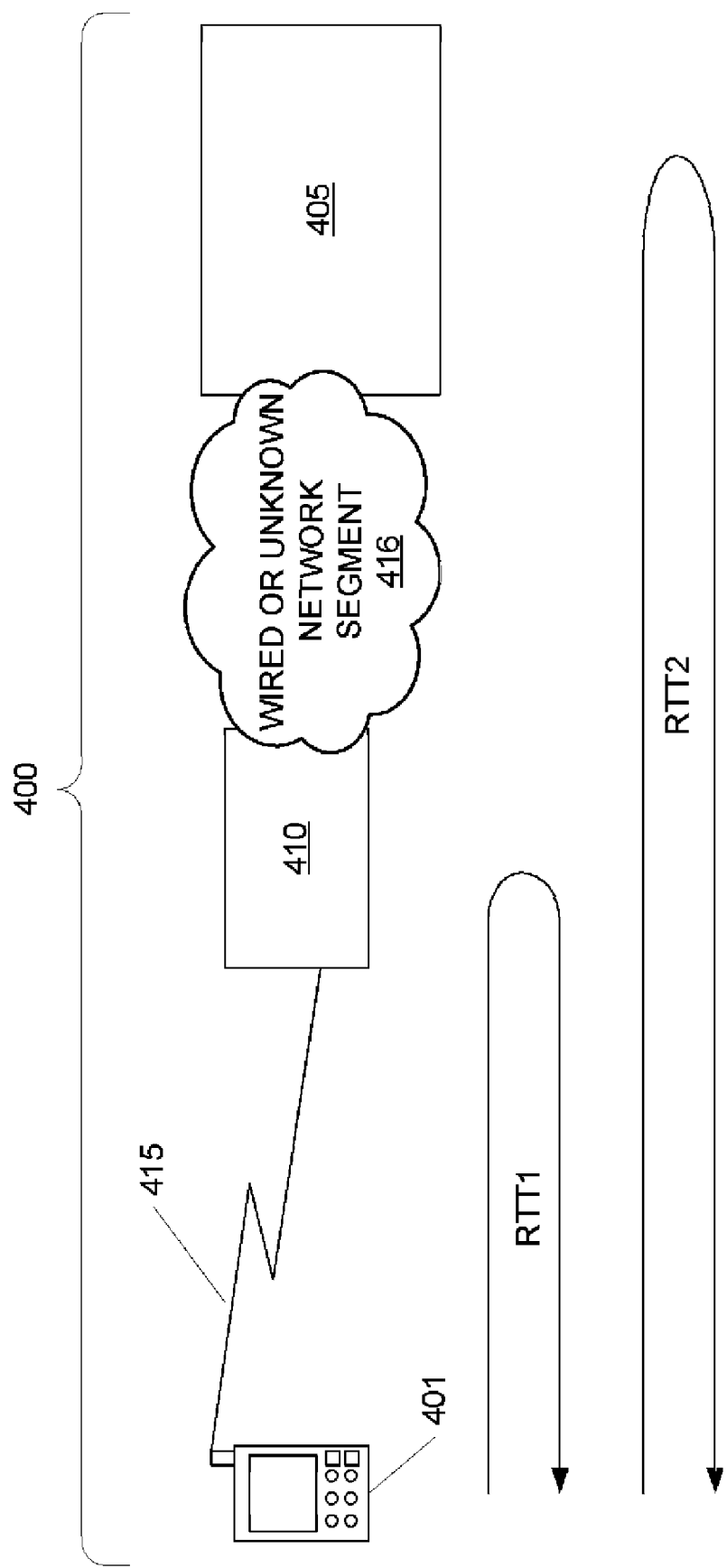
FIG. 4 is a block diagram of a heterogeneous network according to one or more aspects described herein.

FIG. 4 is a block diagram of a heterogeneous network 400 for distributing content between a source device 401 and a sink device 405. Source device 401 may be one of a variety of wireless communication devices such as a mobile telephone or a personal data assistant (PDA). Network 400 includes an intermediate network router 410 which divides the transmission path into multiple network segments 415 and 416. Further, each network segment 415 and 416 uses a different network protocol. Specifically, segment 415 includes a wireless network connection between source device 401 and intermediate router 410 while segment 416 is a wired or unknown network segment between router 410 and sink 405. A content item transmitted by source device 401 to sink 405 may initially travel over wireless network segment 415 to intermediate router 410 prior to being transmitted over wired or unknown connection 416 to the destination sink device 410.

To insure that a requested content transfer or propagation is performed within an authorized proximity limit, the wireless portion 415 of the heterogeneous network may be analyzed using explicit distance measurement techniques. For example, the signal power of a message received from intermediate router 410 may be measured. From the received signal power, an explicit distance between device 401 and router 410 may be derived using mathematical equations and relationships. On the other hand, to evaluate the conformance of the wired or untrusted segment 416 of network 400, RTT analysis of network 400 and network segments 415 and 416 may be conducted to determine whether network 400 and/or segments 415 and 416 thereof meet predefined proximity requirements.

In one or more configurations, the RTT associated with the wireless segment 415 of network 400 may be determined separately from the RTT associated with network 400 as a whole. One method of determining the RTT of segments 415 and 416 involves setting the TTL of a message, such as an echo request, to the number of hops that are to be measured. Thus, in one example, to measure only wireless segment 415 from source 401, the TTL of an echo request sent by source device 401 may be set to TTL=1. At the first hop, i.e., intermediate router 410, the TTL of the echo request is decremented to 0. In response to determining that the TTL has been decremented to 0, intermediate router 410 may acknowledge or otherwise respond to the echo request. The amount of time required for a response to be received at source device 401 is then calculated. Similarly, to measure or determine the RTT of the entire network 400, the TTL of an echo request may be set to TTL=2. Even though router 410 receives the echo request, router 410 does not respond to the echo request, as it did in the previous example, since the TTL has not been decremented to 0 at router 410. Instead, the TTL is decremented to 1 at router 410 and is later decremented to 0 at the next hop in the network, sink device 405. Thus, sink device 405, upon decrementing the TTL to 0, would respond with an acknowledgment or echo message. Once source device 401 receives the response, the RTT of network 400 as a whole may be appropriate determined.

The determined RTT of the trusted or wireless segment 415 of network 400 is identified as RTT1 in FIG. 4. The RTT of the entire network 400 is labeled RTT2. Upon determining RTT1 and RTT2, the RTT of the remaining untrusted or wired segment 415 of network 400 may be determined by, in one or more arrangements, calculating the difference between RTT1 and RTT2 (i.e., RTT2−RTT1). The RTT of the wired segment 416 of network 400 is then evaluated to determine whether the RTT is within a predefined RTT limit set by the content originator or creator.

Either source device 401 or destination sink device 405 may be responsible for determining whether the content transfer is authorized based on the predefined proximity requirement. In one example, source device 401 may initially transmit echo requests to determine the relevant RTTs of segments 415 and 416 of network 400 and determine whether the RTT limit and proximity requirements are satisfied by the individual segments 415 and 416 and network 400 as a whole. If the limits and requirements have been met, device 401 may then send the content item to sink device 405 indicating that the transfer is authorized. Alternatively or additionally, sink device 405 may also evaluate the propriety of a particular content transfer. For example, source device 401 may transmit, along with the content item, the determined RTTs and/or distances associated with network 400, and segments 415 and 416 thereof, to sink device 405. Sink device 405 may then make an independent determination regarding whether the RTT limits and proximity requirements have been satisfied prior to accepting the transfer.

Figure 5:
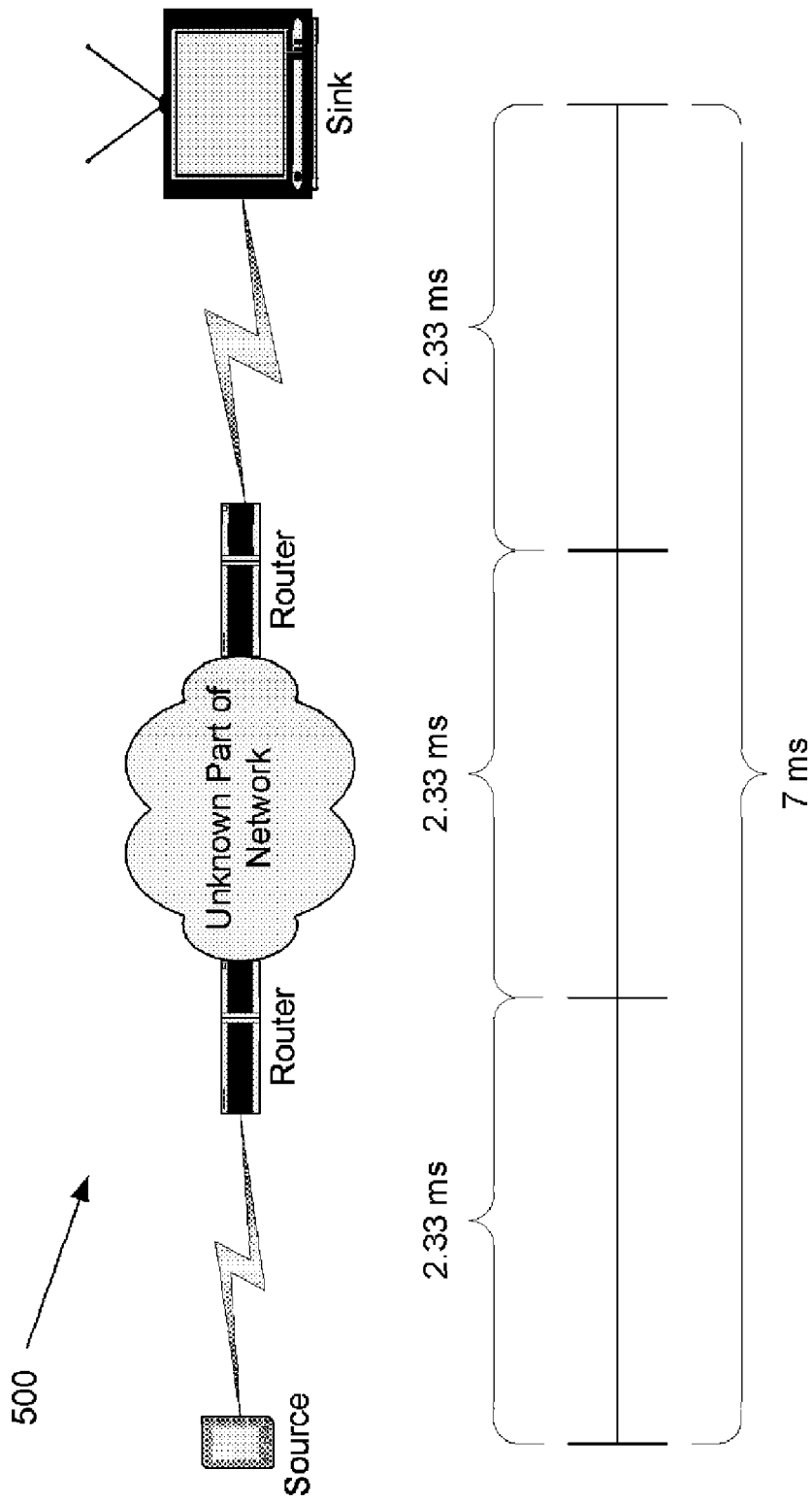
FIG. 5 illustrates the budgeting of a predefined round trip time limit among multiple segments of a network according to one or more aspects described herein.

The RTT limit for a given content item or network may be predetermined and predefined by the content creator or originator. The RTT limit may be set based on typical response times of typical or common networks. For example, a typical response time to an echo request in an IP-based home network may be approximately 7 ms. The overall RTT limit may then be divided to provide each segment of a network with individual RTT budgets. In FIG. 5, a heterogeneous network 500 having three segments is illustrated with an RTT limit of 7 ms. The overall RTT limit of network 500 may be divided into RTT budgets for each of the network segments. Additionally, the RTT budgets may also be grouped into a first RTT budget associated with trusted segments and a second RTT budget corresponding to untrusted segments of the network. Accordingly, the determined RTT of the untrusted segments may be evaluated with respect to the summed untrusted RTT budget to insure the propriety of a particular content transfer. In one or more configurations, the wireless or trusted segments of network 500 may be exempt from the RTT budget requirements. The RTT budget requirement may be waived for wireless or trusted segments since explicit distances of the wireless segments may be determined using other, more reliable methods (e.g., using signal power). Thus, determining whether the RTT of a wireless segment falls within the RTT budget requirement might not be as accurate and may be superfluous. The RTT limit may be divided into equal RTT budgets for each of the network segments. Alternatively or additionally, the RTT limit may be budgeted equally among only the untrusted network segments. For example, each segment of network 500 may be appropriated an RTT budget of 2.33 ms (i.e., 7/3 ms). Alternatively, the RTT limit may be divided according to various other rules if a compliance body for the employed content protection system so chooses.

The RTT of the wired segments of network 500 may be compared to the RTT budget for that wired segment to determine whether the proximity requirement of the digital rights management mechanism has been met. That is, the RTT of the wired segments may be compared to a budget of, for example, 2.33 ms to determine whether the RTT is below this threshold. If the RTT of the wired segments is below or equal to the 2.33 ms threshold, the content transfer may be authorized and/or accepted. If, however, the RTT of the wired or untrusted segments of network 500 is above the allotted RTT budget, the content transfer may be disrupted or otherwise denied.

Figure 6:
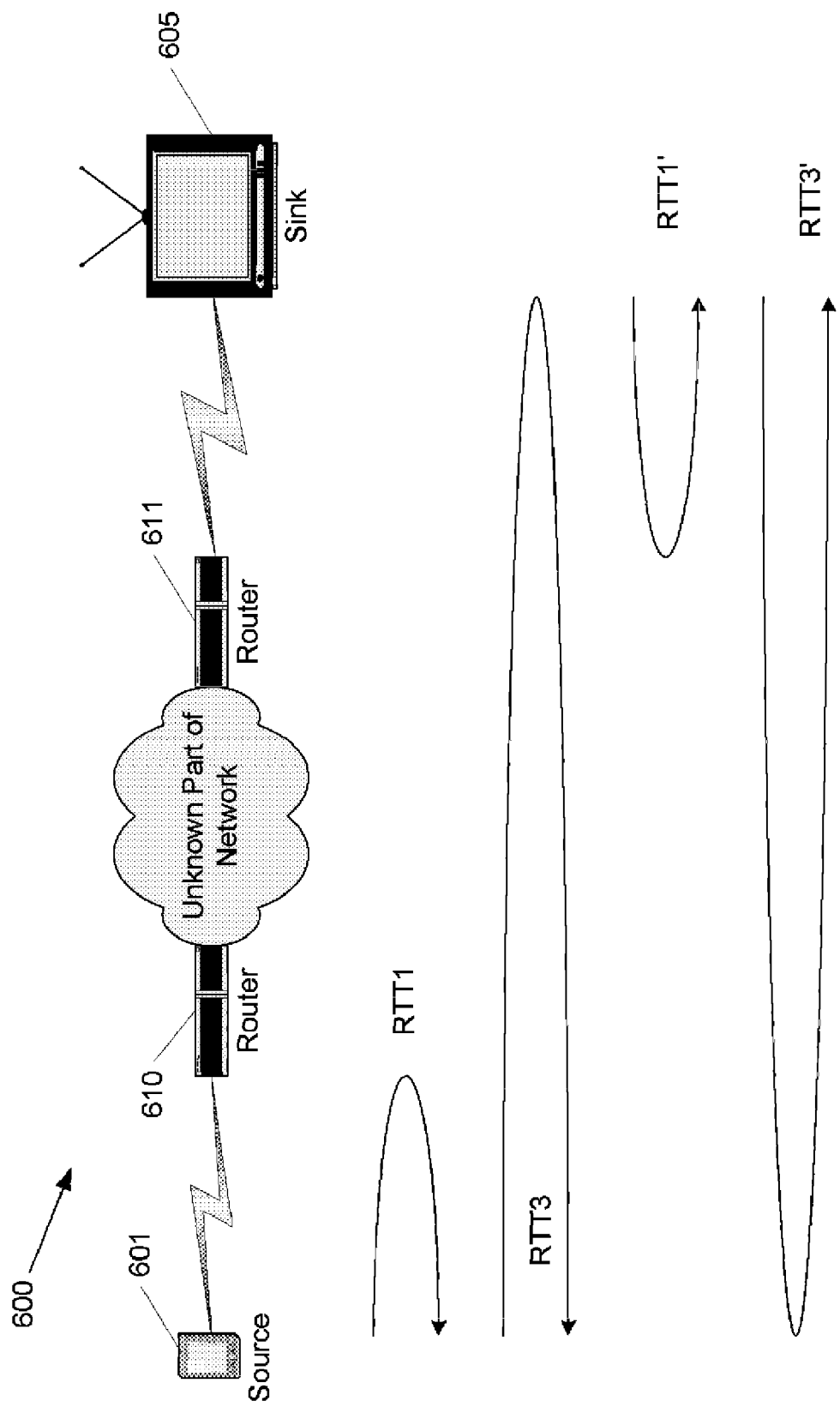
FIG. 6 is a block diagram of a heterogeneous network with multiple intermediate network routers according to one or more aspects described herein.

FIG. 6 is a diagram of another heterogeneous network 600 with two intermediate routers 610 and 611 implemented between source 601 and sink 605. Source 601 is connected to router 610 via a wireless connection and sink 605 is similarly connected to router 611 through a wireless connection. The connection or network segment between intermediate routers 610 and 611 is a wired or unknown segment of network 600. The RTTs associated with the different segments of network 600 are illustrated and labeled as well. For example, the RTT between source device 601 and router 610 is identified as RTT1 while the RTT between sink 605 and router 611 is indicated by RTT1'.

The overall RTT limit of network 600 may be budgeted equally among the three segments of network 600. However, as discussed with respect to FIG. 5, the RTT budget requirements may be waived for certain trusted segments of network 600, such as the wireless segment between source 601 and router 610, whose distance may be explicitly measured.

Accordingly, sink 605 may measure the distance between router 611 and sink 605 to insure that the proximity requirement is met. Sink 605 may further determine RTT1' and transmit the RTT information to source 601 so that source 601 may appropriately determine the RTT of the wired or untrusted segment of network 600. Specifically, source 601 may measure the overall RTT, RTT3, of network 600 and the RTT, RTT1, of the wireless segment between source 601 and router 610. Source 601 may then use RTT3, RTT1 and RTT1' to calculate the remaining RTT corresponding to the wired network segment of network 600.

In one or more configurations, sink 605 performs the RTT calculations and determinations. That is, sink 605 may transmit an echo request to measure the overall RTT, RTT3', of network 600 and request and receive RTT information from source 601 for the wireless segment between source 601 and router 610. Additionally, sink 605 may calculate the unknown segment's RTT by determining the difference between RTT3' and the RTTs, RTT1 and RTT1', of the wireless network segments (i.e., RTT3'−RTT1'−RTT1). Thus, if either of the distances associated with the wireless segments of network 600 fail to meet the proximity requirement or if the RTT of the wired or unknown segment fails to fall within the allotted RTT budget, the content transfer may be refused or denied.

Figure 7:
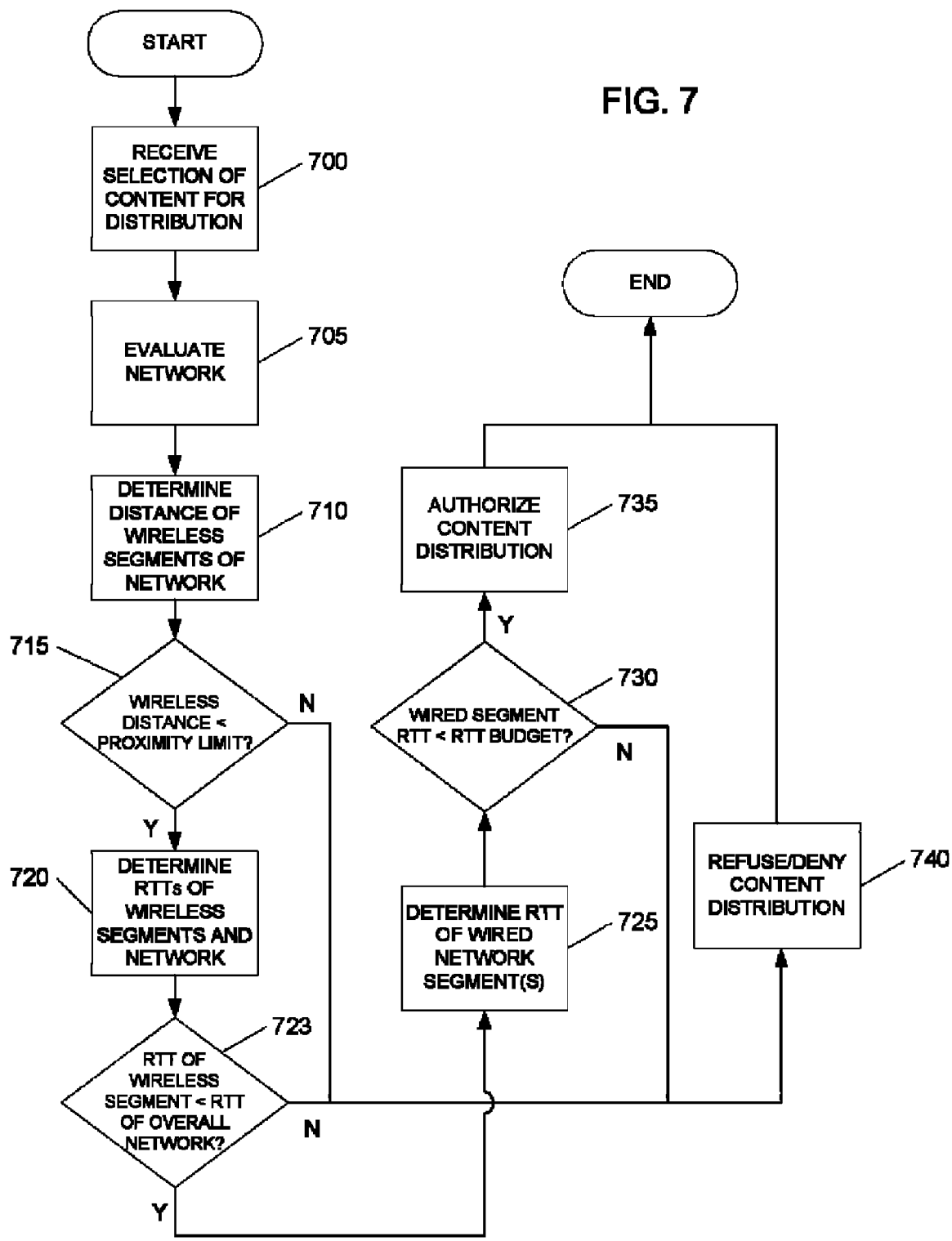
FIG. 7 is a flowchart illustrating a method for enforcing proximity requirements for content propagation in a network according to one or more aspects described herein.

FIG. 7 is a flowchart illustrating a method for enforcing proximity requirements of content transfers in a heterogeneous network. In step 700, user input is received selecting a file for transfer to a destination device. In step 705, the network is evaluated to determine the number of segments in the network and/or the types of network links used. In one or more embodiments, the types of network links used may be predefined based on a known construction of the network. For example, a network may include a router between the source and destination device. The communication link between the source and the router may be a wireless connection while the segment between the router and the destination may be a wired link. A distance may then be determined for the wireless segments of the network in step 710. One method for determining the distance of wireless segments involves using the received power of a signal to calculate a corresponding distance. In one or more arrangements, RF signals are transmitted with a power inversely proportional to the square of the distance. The determined distance is then compared, in step 715, to a proximity requirement to determine whether the distances fall within the proximity limit. If the proximity requirement is not met, the content transfer may be refused and/or denied in step 740.

If, however, the proximity requirement is met, in step 720, RTTs associated with each of the wireless segments and for the overall network are determined. The RTTs may be determined, in one instance, by issuing an echo request over the desired network segment and timing the response to the echo request. In one or more arrangements, several echo requests may be sent to determine an average RTT rather than using a single RTT measurement. Alternatively, the RTT may be set at the maximum or minimum response time determined from the multiple echo requests. The determined RTTs may further be evaluated by comparing the overall RTT of the entire network with the RTT of the individual wireless segments in step 723. Specifically, a determination may be made as to whether the overall RTT is greater than the RTT of the wireless segments. This step insures that intermediate routers have not been modified or hacked to manipulate and provide false response times and RTT measurements. If the overall RTT is not greater than the wireless segment RTT(s), the content transfer may be denied in step 740.

Upon determining the RTT for the overall network and for each of the wireless network segments, an RTT is calculated for the wired or untrusted network segments in step 725. The RTT for the wired segments may be calculated by determining the difference between the overall network RTT and the wireless segment RTT(s). The wired segment RTT is then compared with a RTT budget allotted based on an overall RTT limit in step 730. The RTT limit may be defined in accordance with a variety of rules. For example, the RTT limit may be defined based on compliance rules employed by the content protection system or scheme. Alternatively or additionally, the RTT limit may be specified by the digital rights metadata associated with the transferred content. In one example, the RTT budget may be set to the overall RTT limit divided by the number of segments in the network. If the wired RTT is within the RTT budget, the content transfer is approved and allowed to proceed in step 735. If, however, the RTT for the wired segment or segments of the network exceed the allotted RTT budget, the content transfer may be denied or refused in step 740.

The methods and systems for enforcing content propagation may be combined with a variety of digital rights management and content protection mechanisms. For example, the systems and methods may be combined with DVB Content Protection and Copy Management (CPCM) systems that involve using Authorized Domain (AD) and Local Environment (LE) concepts. Specifically, the proximity limited content propagation methods and systems described herein may be used in conjunction with the LE concepts of DVB CPCM. Additional information regarding DVB CPCM and DTCP-IP technologies may be found by consulting the DVB Project Organization, which provides documents relating to DVB technologies and which is currently hosted at http://www.dvb.org/technology/dvb-cpcm/. Information regarding DTCP technologies is also available through the Digital Transmission Licensing Administrator (DTLA), which is currently located at http://www.dtcp.com.

The methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

The present invention has been described in terms of several exemplary embodiments thereof. Numerous other embodiments, modifications and variations within the scope and spirit of the appended claims will occur to persons of ordinary skill in the art from a review of this disclosure.

I claim:

1. A method comprising:
    receiving, at a content source from a sink, round trip time information of a first segment of a content propagation network established between the content source and the sink;
    determining whether a first round trip time of the first segment exceeds a proximity threshold, wherein the determination is based on the received round trip time information, and wherein the first segment is between the sink and an intermediate network device situated between the content source and the sink; and
    determining a second round trip time associated with a second segment of the network, wherein the determination of the second round trip time is based on a difference between a total round trip time between the content source and the sink and the first round trip time.

2. The method of claim 1, wherein the first segment comprises at least one of a wireless link and a wired link between the sink and the intermediate network device.

3. The method of claim 2, wherein the second segment comprises a link between the intermediate network device and the content source.

4. The method of claim 1, wherein the receiving is responsive to a request by the content source for the round trip time information.

5. The method of claim 1, wherein the round trip time information is determined by the sink.

6. The method of claim 1, further comprising authorizing propagation of a content item over the network to the sink in response to a determination that the first round trip time does not exceed the proximity threshold.

7. The method of claim 1, further comprising preventing propagation of a content item over the network to the sink in response to determining that the first round trip time exceeds the proximity threshold.

8. An apparatus comprising:
a processor; and
memory operatively coupled to the processor and storing computer readable instructions that, when executed, cause the apparatus to:
receive, from a sink, round trip time information of a first segment of a content propagation network established between the apparatus and the sink;
determine whether a first round trip time of the first segment exceeds a proximity threshold, wherein the determination is based on the received round trip time information, and wherein the first segment is between the sink and an intermediate network device situated between the apparatus and the sink; and
determine a second round trip time associated with a second segment of the network, wherein the determination of the second round trip time is based on a difference between a total round trip time between the apparatus and the sink and the first round trip time.

9. The apparatus of claim 8, wherein the apparatus includes a content source and wherein the receiving is responsive to a request by the content source for the round trip time information.

10. The apparatus of claim 8, wherein the computer readable instructions, when executed, further cause the apparatus to authorize propagation of a content item over the network to the sink in response to a determination that the first round trip time does not exceed the proximity threshold.

11. The apparatus of claim 8, wherein the first segment comprises at least one of a wireless link and a wired link between the sink and the intermediate network device.

12. The apparatus of claim 11, wherein the second segment comprises a link between the intermediate network device and the content source.

13. One or more non-transitory computer readable media storing computer readable instructions that, when executed, cause an apparatus to:
receive, from a sink, round trip time information of a first segment of a content propagation network established between the apparatus and the sink;
determine whether a first round trip time of the first segment exceeds a proximity threshold, wherein the determination is based on the received round trip time information, and wherein the first segment is between the sink and an intermediate network device situated between the apparatus and the sink; and
determine a second round trip time associated with a second segment of the network, wherein the determination of the second round trip time is based on a difference between a total round trip time between the apparatus and the sink and the first round trip time.

14. The one or more non-transitory computer readable media of claim 13, wherein the apparatus includes a content source and wherein the receiving is responsive to a request by the content source for the round trip time information.

15. The one or more non-transitory computer readable media of claim 13, wherein the computer readable instructions, when executed, further cause the apparatus to authorize propagation of a content item over the network to the sink in response to a determination that the first round trip time does not exceed the proximity threshold.

16. The one or more non-transitory computer readable media of claim 13, wherein the first segment comprises at least one of a wireless link and a wired link between the sink and the intermediate network device.

17. The one or more non-transitory computer readable media of claim 16, wherein the second segment comprises a link between the intermediate network device and the content source.

* * * * *